United States Patent
Joshi et al.

(10) Patent No.: US 9,652,309 B2
(45) Date of Patent: May 16, 2017

(54) MEDIATOR WITH INTERLEAVED STATIC AND DYNAMIC ROUTING

(75) Inventors: Maneesh Joshi, Palo Alto, CA (US); Rakesh Saha, Union City, CA (US); Demed L'Her, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1715 days.

(21) Appl. No.: 12/120,825

(22) Filed: May 15, 2008

(65) Prior Publication Data

US 2009/0287845 A1    Nov. 19, 2009

(51) Int. Cl.
*G06F 15/16*    (2006.01)
*G06F 9/54*    (2006.01)

(52) U.S. Cl.
CPC .................. *G06F 9/546* (2013.01)

(58) Field of Classification Search
CPC ....................................... G06F 9/546
USPC ....................................... 709/238
See application file for complete search history.

(56) References Cited

U.S. PATENT DOCUMENTS

| | | | |
|---|---|---|---|
| 4,970,658 | A * | 11/1990 | Durbin et al. .................. 706/60 |
| 6,308,216 | B1 * | 10/2001 | Goldszmidt ........ H04L 12/2602 709/224 |
| 2005/0278345 | A1 * | 12/2005 | Andra et al. .................. 707/100 |
| 2006/0031388 | A1 * | 2/2006 | Tankov et al. ................. 709/217 |
| 2006/0122971 | A1 | 6/2006 | Berg et al. |
| 2006/0212593 | A1 | 9/2006 | Patrick et al. |
| 2007/0011126 | A1 | 1/2007 | Conner et al. |
| 2007/0162500 | A1 | 7/2007 | Herwadkar |
| 2007/0171923 | A1 * | 7/2007 | Eisner et al. ................. 370/401 |
| 2007/0226320 | A1 * | 9/2007 | Hager et al. .................. 709/219 |
| 2007/0233603 | A1 * | 10/2007 | Schmidgall et al. .......... 705/51 |
| 2007/0239742 | A1 | 10/2007 | Saha et al. |
| 2008/0263223 | A1 * | 10/2008 | Degenaro et al. ............ 709/238 |
| 2009/0086947 | A1 * | 4/2009 | Vendrow ................. 379/201.12 |
| 2010/0211938 | A1 * | 8/2010 | Singh et al. .................. 717/141 |

OTHER PUBLICATIONS

Mohamad Afshar and Manoj Das, "Oracle Service-Oriented Architecture Suite", Oct. 2007, pp. 1-44.
Oracle, "Oracle SOA Suite", 2006, pp. 1-4.
Oracle, "Oracle Enterprise Service Bus", Oct. 2006, pp. 1-2.
Greg Pavlik, "Next-Generation SOA Infrastructure", May 2007, pp. 1-6.
Bhavin Raichura and Shaurabh Bharti, "Achieve Dynamic Integration and Runtime Process Optimization Using Semantic SOA", ARD Prasad & Devika P. Madalli (Eds.): ICSD-2007, pp. 133-143.
M. Cassandra Smith, Ph.D., Elizabeth D. Zeisler and Michael W. Hooper, "Data Access and Ingtegration Architectures".
"Enterprise Integration Patterns—Routing Slip", http://www.enterpriseintegrationpatterns.com/RoutingTable.html.
Vimmika Dinesh "Oracle Enterprise Service Bus Quick Start Guide 10G (10.1.3.1.0)", 2006, pp. i-2-1.
Mohamad Afshar and Manoj Das "Oracle Service Oriented Architecture Suite", Jun. 2007, pp. 1-43.

\* cited by examiner

*Primary Examiner* — Bryan Lee
(74) *Attorney, Agent, or Firm* — Miles & Stockbridge P.C.

(57) ABSTRACT

A system for routing an application message detects that routing rules are dynamic and static. The system then invokes a rules engine to receive the dynamic routing rules and interleaves the dynamic routing rules with static routing rules. The system then executes the interleaved rules to route the message.

11 Claims, 4 Drawing Sheets

MEDIATOR WITH INTERLEAVED STATIC AND DYNAMIC ROUTING

FIELD OF THE INVENTION

One embodiment is directed generally to computer applications, and in particular to routing between computer applications.

BACKGROUND INFORMATION

Companies have long sought to integrate existing systems in order to implement information technology support for all business processes required to run a business. However, most companies implement disparate computer applications that may come from different vendors and may run on different systems. Integration of these systems and processes frequently require data and protocol mediation between the applications. The data and protocol mediation between computer business applications, especially enterprise business applications, is often achieved through routing based on content and/or context. In many known computer systems, an enterprise service bus ("ESB") or mediator lies between the business applications and enables communication among them.

Ideally, the ESB is able to replace all direct contact with the applications on the bus, so that all communication takes place via the bus. In order to achieve this objective, the bus typically will encapsulate the functionality offered by its component applications in a meaningful way. This is typically accomplished through the use of an enterprise message model. The message model defines a standard set of messages that the ESB will both transmit and receive. When it receives a message, the ESB routes it to the appropriate application. This routing is typically based on either static or dynamic rule sets.

SUMMARY OF THE INVENTION

One embodiment is a system for routing an application message. The system detects that routing rules are dynamic and static. The system then invokes a rules engine to receive the dynamic routing rules and interleaves the dynamic routing rules with static routing rules. The system then executes the interleaved rules to route the message.

DETAILED DESCRIPTION

One embodiment is a ESB/mediator that interleaves both static and dynamic rule sets in order to route business application messages. Therefore, users can employ static routing decisions for initial non-complex use cases and then add more dynamicity in the system through rule engine driven dynamic routing decisions.

Figure 1:
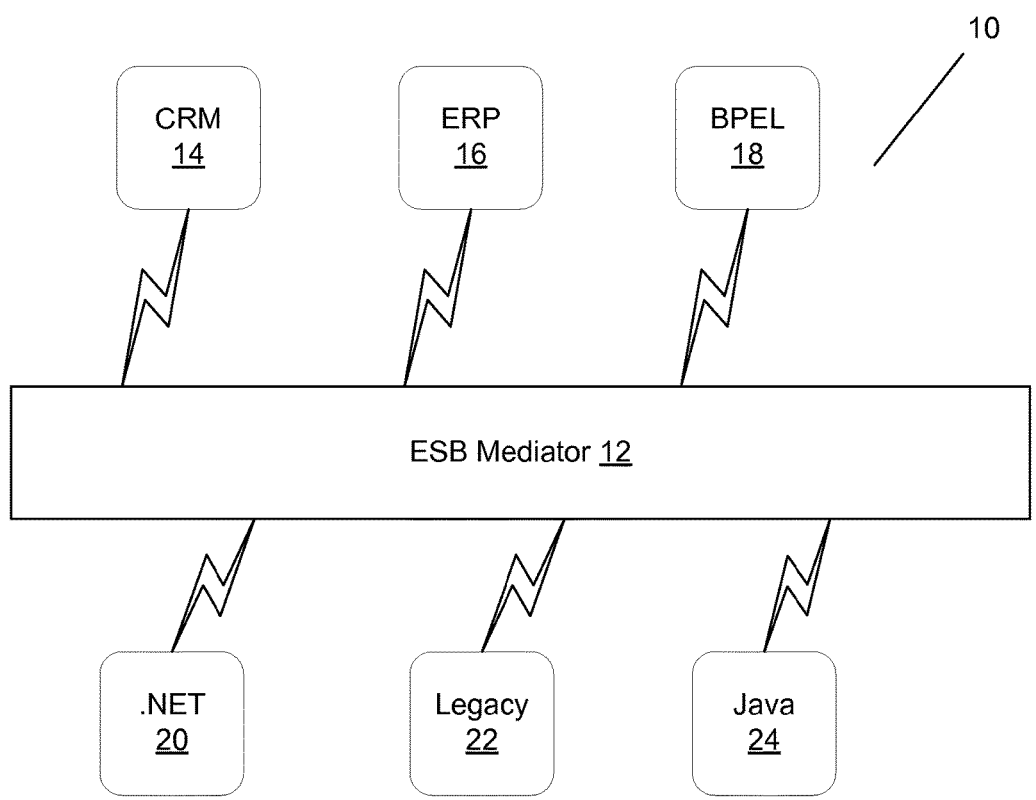
FIG. 1 is a block diagram of a business application integration system that includes an ESB/mediator in accordance with an embodiment of the present invention.

FIG. 1 is a block diagram of a business application integration system 10 that includes an ESB/mediator 12 in accordance with an embodiment of the present invention. Mediator 12, in general, moves data among multiple application endpoints, both within and outside of an enterprise. Some of the possible disparate application endpoints, as shown in FIG. 1, include a customer relationship management ("CRM") system 14, an Enterprise Resource Planning ("ERP") system 16, a Business Process Execution Language ("BPEL") based system 18, a Microsoft.NET infrastructure 20, a legacy system 22, or a Java-based system 24.

In one embodiment, mediator 12 uses open standards to connect, transform, and route business documents as Extensible Markup Language ("XML") messages, among disparate applications. It enables monitoring and management of business data, with minimal impact on existing applications. In one embodiment, mediator 12 is the underlying infrastructure for delivering a service-oriented architecture ("SOA"). In one embodiment, mediator 12 is part of and interacts with other components of the Oracle SOA Suite from Oracle Corp. In other embodiments, instead of routing XML encoded messages, other types of encoded messages such as text messages, binary messages, etc., can be routed by mediator 12.

Figure 2:
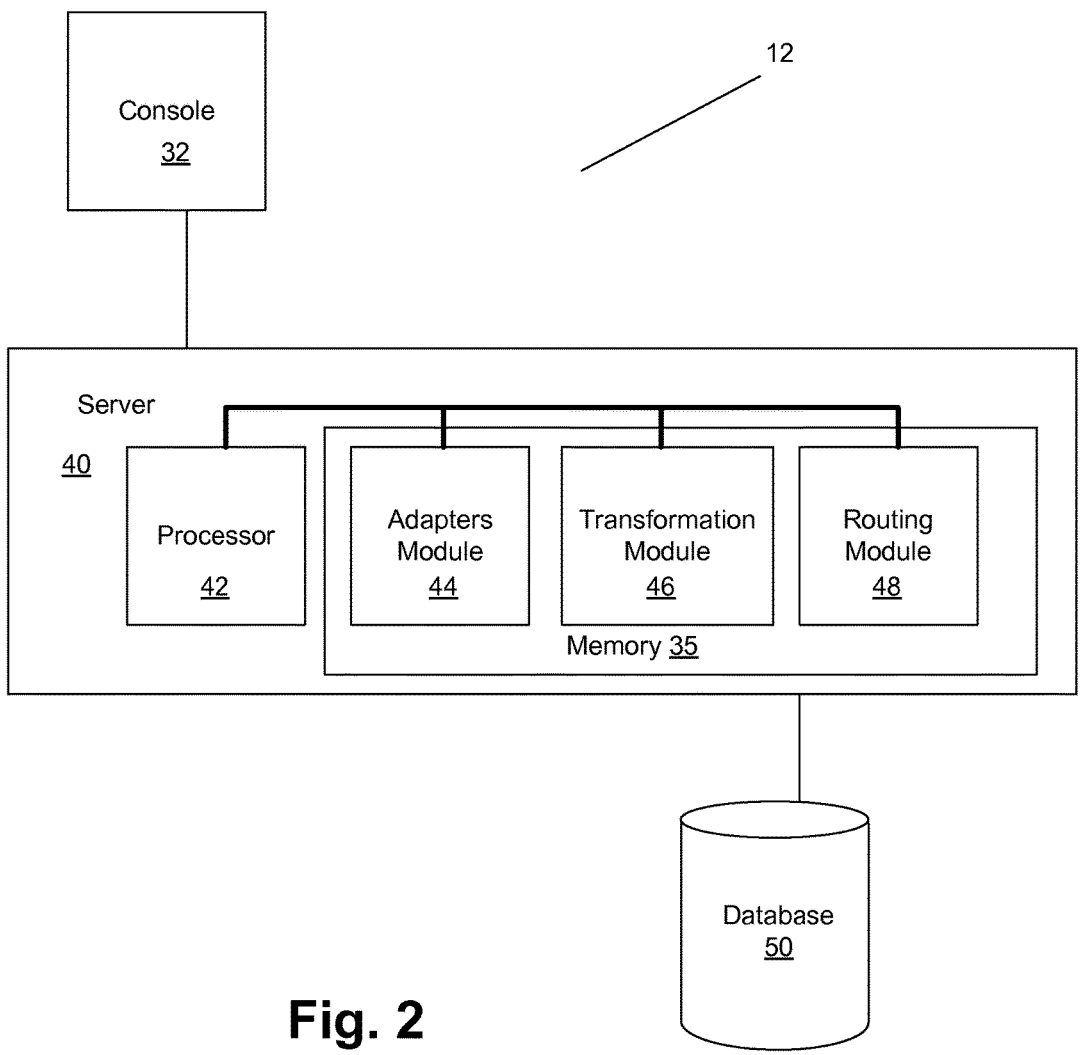
FIG. 2 is a block diagram of the mediator of FIG. 1 in accordance with one embodiment.

FIG. 2 is a block diagram of mediator 12 of FIG. 1 in accordance with one embodiment. Mediator 12 includes a server 40. Server 40 includes a processor 42 and memory 35. Processor 42 may be any type of general or specific purpose processor. Memory 35 stores information and instructions to be executed by processor 42. Memory 35 can be comprised of any combination of random access memory ("RAM"), read only memory ("ROM"), static storage such as a magnetic or optical disk, or any other type of computer readable media.

Computer readable media may be any available media that can be accessed by processor 42 and includes both volatile and nonvolatile media, removable and non-removable media, and communication media. Communication media may include computer readable instructions, data structures, program modules or other data in a modulated data signal such as a carrier wave, or other transport mechanism, and includes any information delivery media.

In one embodiment, memory 35 stores software modules that provide functionality when executed by processor 42. The modules include an operating system (not shown), adapters module 44, transformation module 46 and routing module 48. The functionality of these modules, although shown as software in FIG. 2, can be implemented by any combination of hardware or software in other embodiments.

In one embodiment, adapters module 44 provides connectivity to data sources and includes multiple adapters to provide bidirectional, real-time data access to virtually any data source in an enterprise. An adapter either listens for, or polls for, events in the source application it supports. An event in one embodiment can be a notification of a request to perform an action, or a notification that the action has occurred. When listening for events, an adapter registers as a listener for the application that is configured to push events to the adapter. The adapter can also poll the back-end application, such as a database or file, for the events required by mediator 12.

In one embodiment, transformation module 46 provides document transformation and includes a standards-based data mapper. The data mapper specifies an .xslt file to transform data from one XML schema to another, thus enabling data interchange among applications using different schemas. Multiple transformations may be implemented to achieve the desired result.

In one embodiment, routing module 48 provides content-based routing for the XML messages. Data contained within the XML messages are distributed from the source application to a target application using routing services. A routing service determines how a message gets from one point to another within system 10 of FIG. 1 as defined by the routing rules and transformations it applies on the XML message and the various rules it applies. In one embodiment, the routing rules specify the set of services that mediator 12 will invoke when the routing service receives a message. In one embodiment, the following parameters can be specified when a routing rule is configured: (1) Whether a filter expression is applied. A filter expression specifies that the contents (payload or header) of a message be analyzed before any service is invoked. For example, a filter expression may be applied that specifies that the database adapter service be invoked only if the message includes customer contact information; (2) Whether a document transformation is applied; and (3) Whether execution is synchronous or asynchronous. If the execution is specified as synchronous, then mediator 12 will invoke the target service immediately in one embodiment. Control is not returned to the current service until the message has been received by the target service for processing. If the execution is specified as asynchronous, then mediator 12 uses Java Message Service ("JMS") for delivering the message to the target service, which will be invoked at a later time. Control is returned to the current service immediately upon delivery to the JMS, before the target service has received the message.

Mediator 12 further includes a console 32 which can be used for configuring and managing mediator 12. In one embodiment, console 32 provides a Web-based interface for managing, administering and debugging services that have registered with mediator 12. Mediator 12 further includes a data store database 50 that stores mediator metadata such as schemas, transformations, and routing rules.

Figure 3:
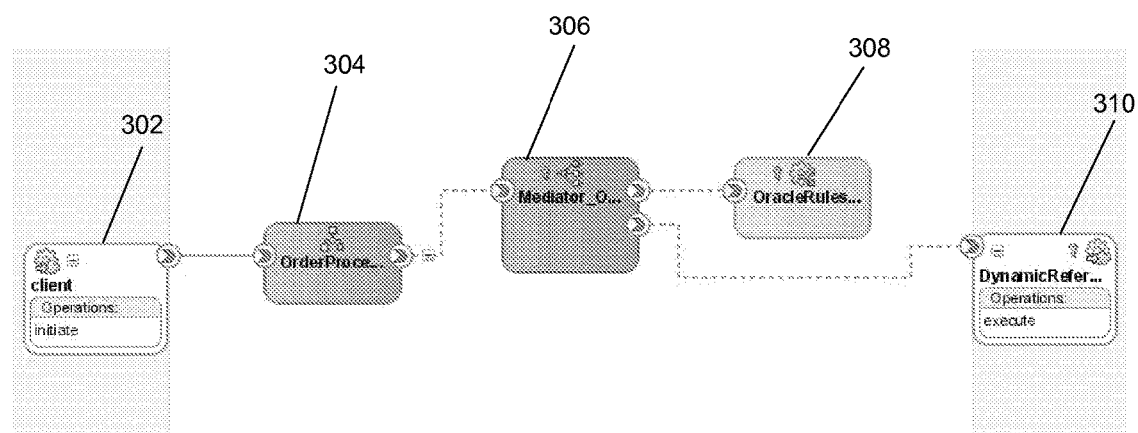
FIG. 3 is a block diagram of an example business flow that incorporates a mediator in accordance with an embodiment of the present invention.

FIG. 3 is a block diagram of an example business flow that incorporates a mediator in accordance with an embodiment of the present invention. In the example of FIG. 3, a purchase order in the form of a message is routed to a target service, such as a fulfillment service. The purchase order is routed based on pre-defined static rules and dynamically determined rules. For example, a static rule may be to route the purchase order to a particular fulfillment service based on the amount of the purchase order. An example of a dynamic rule may be to route the purchase order based on a set of complex business rules that may or may not depend on externally available data. For example, the dynamic rule may invoke a target service A based on the message content, such as if the purchase order amount is greater than $10,000 and source of the purchase order is "North America", and based on the relative availability of the target service A with respect to other services B, C, and D.

As shown in FIG. 3, the client application 302 sends the purchase order to an order processing module 304. Order processing module 304 forwards the purchase order to a mediator 306 that receives dynamic rules from a rules engine 308. A user can add or modify the rules in rules engine 308 at runtime by modifying the rules written in a rules language or written using a decision table without having to redeploy the composite application. Mediator 306 also includes static rules that can not be modified at run time. Mediator 306 determines the target service 310 based on both the static and dynamic rules.

Figure 4:
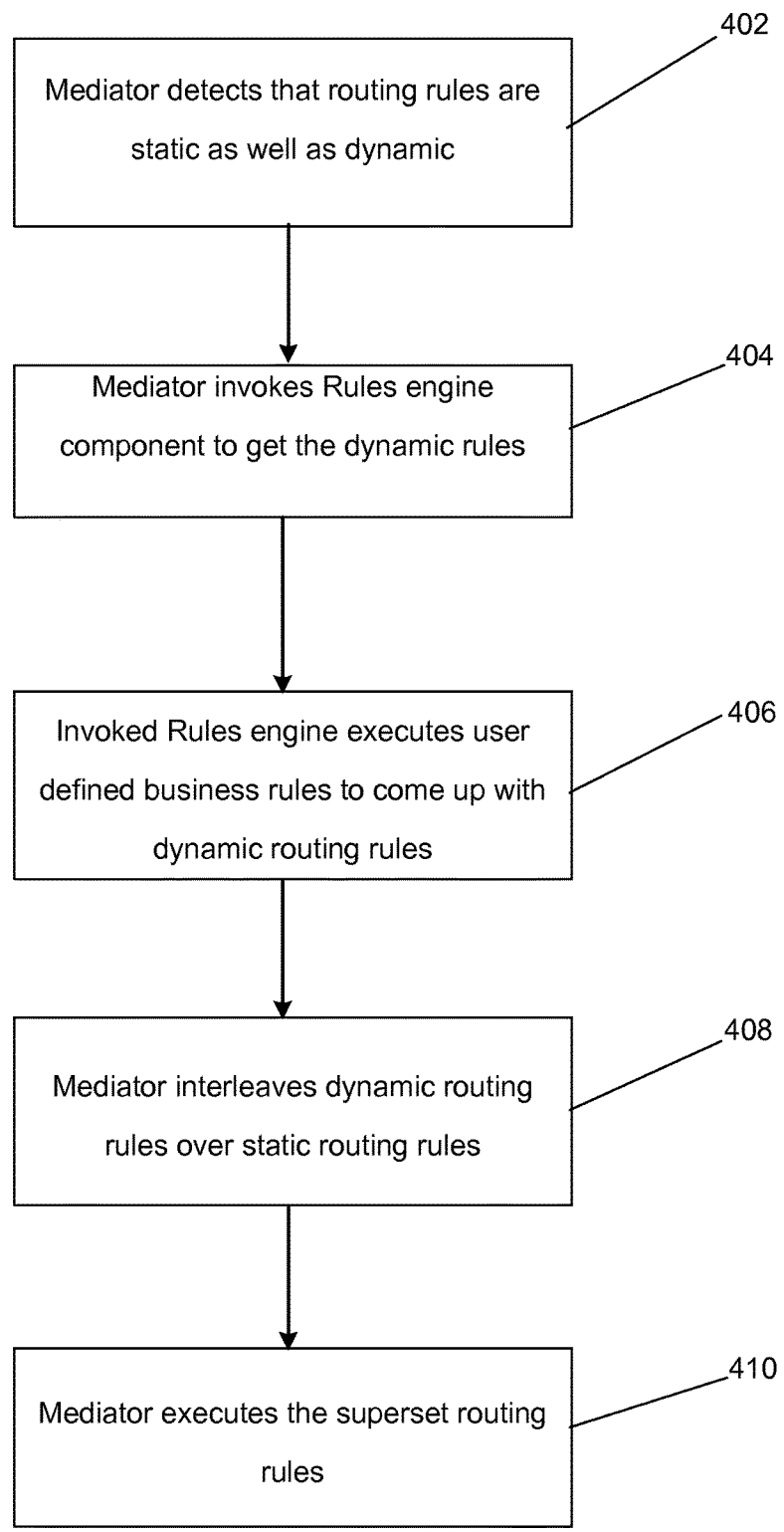
FIG. 4 is a flow diagram of the functionality of the mediator of FIG. 3 in accordance with one embodiment when mediating a business process.

FIG. 4 is a flow diagram of the functionality of mediator 306 of FIG. 3 (or mediator 12 of FIG. 1) in accordance with one embodiment when mediating a business process. In one embodiment, the functionality of the flow diagram of FIG. 4 is implemented by software stored in memory or other computer readable or tangible medium, and executed by a processor. In other embodiments, the functionality can be performed by hardware, or any combination of hardware and software.

At 402, mediator 306 detects that the routing rules are static as well as dynamic. Mediator 306 detects its configuration to interleave static and dynamic rules based on the mediator metadata.

At 404, mediator 306 invokes rules engine 308 to get the dynamic rules. Mediator 306 has already stored the static rules which were predefined before run time.

At 406, invoked rules engine 308 executes user defined business rules to come up with dynamic routing rules and sends these rules to mediator 306.

At 408, mediator 306 interleaves dynamic routing rules over static routing rules. In one embodiment, mediator 306 interleaves by invoking rules engine 308 multiple times for each of the dynamic rules. For example, (1) execute static rule A; (2) Invoke rules engine 308 and then execute the returned dynamic ruleset B; (3) invoke static rule C; (4) invoke rules engine 308, and so on.

In another embodiment, mediator 306 interleaves by superimposing the dynamic rule on top of the static rule to create a "superset" routing rule. For example, a static rule may be:

```
<case executionType="queued" name=
"MediatorRC.MediatorRC.execute">
    <action>
        <transform>
            <part name="$out.request"
                function="xslt(xsl/singleString_To_singleString.xsl,
                $in.request)"/>
        </transform>
        <invoke reference="MediatorRC.MediatorRC" operation="execute">
        </invoke>
    </action>
</case>
```

A dynamic rule may be:

```
<case name="MediatorRC.MediatorRC.execute">
    <condition language="xpath">
        <expression>$in.request/cb1:singleString = 'hello'</expression>
    </condition>
    <action>
        <invoke reference="Dynamic.Reference" operation="dynamic">
        </invoke>
    </action>
</case>
```

After superimposing or interleaving, the result may be the following rule superset:

```
<case executionType="queued"
name="MediatorRC.MediatorRC.execute">
    <condition language="xpath">
        <expression>$in.request/cb1:singleString = 'hello'</expression>
    </condition>
    <action>
        <transform>
            <part name="$out.request"
                function="xslt(xsl/singleString_To_singleString.xsl,
```

```
    $in.request)"/>
  </transform>
  <invoke reference="Dynamic.Reference" operation="dynamic">
  </invoke>
  </action>
</case>
```

At 410, mediator 306 executes the superset routing rules that include a combination of static and dynamic rules. In one embodiment, the rules are executed by evaluating dynamic rules on demand every time a dynamic branch is reached during execution. In another embodiment, the rules are executed by evaluating all dynamic branches all at once and then executing on the entire plan As disclosed, in one embodiment a mediator routes business process messages based on both static and dynamic rules. This results in a system with selective dynamicity where a user can add and remove dynamic rules without impacting the lifecycle of the solution. This reduces the complexity for managing a fully dynamic system without compromising the agility.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of routing an application message, implemented by a processor, the method comprising:
   detecting that a routing rule comprises both a dynamic routing rule and a static rule;
   receiving the dynamic routing rule and the static routing rule by invoking a rules engine, wherein the dynamic routing rule is modifiable at runtime;
   creating a new single combination routing rule, based on a schema contained in a metadata, by interleaving the dynamic routing rule with the static routing rule by superimposing the dynamic routing rule on top of the static routing rule, wherein the new single combination rule comprises one condition and one action of the dynamic routing rule and one action of the static routing rule;
   evaluating all dynamic branches within the dynamic routing rule at once or on demand every time a dynamic branch is reached; and
   executing the new single combination routing rule to route the application message.

2. The method of claim 1, wherein Java Message Service is used for delivering the message to a target service if execution of the new single combination routing rules is specified as asynchronous.

3. The method of claim 1, wherein the message is an Extensible Markup Language message.

4. The method of claim 1, wherein the executing comprises using Java Message Service.

5. The method of claim 1, wherein the message is routed from a first application to a second application.

6. A mediator comprising:
   a processor configured to access one or more modules;
   an adaptors module;
   a transformation module coupled to the adaptors module;
   a routing module coupled to the transformation module, the routing module functionality comprising:
   detecting that a routing rule comprises both a dynamic routing rule and a static rule;
   receiving the dynamic routing rule and the static routing rule by invoking a rules engine, wherein the dynamic routing rule is modifiable at runtime;
   creating a new single combination routing rule, based on a schema contained in a metadata, by interleaving the dynamic routing rule with the static routing rule by superimposing the dynamic routing rule on top of the static routing rule, wherein the new single combination rule comprises one condition and one action of the dynamic routing rule and one action of the static routing rule;
   evaluating all dynamic branches within the dynamic routing rule at once or on demand every time a dynamic branch is reached; and
   executing the new single combination routing rule to route a message.

7. The mediator of claim 6, wherein the message is an Extensible Markup Language message.

8. The mediator of claim 6, wherein the executing comprises using Java Message Service.

9. A non-transitory computer readable media having instructions stored thereon that when executed by a processor comprise:
   detecting that a routing rule comprises both a dynamic routing rule and a static rule;
   receiving the dynamic routing rule and the static routing rule, wherein the dynamic routing rule is modifiable at runtime;
   creating a new single combination routing rule, based on a schema contained in a metadata, by interleaving the dynamic routing rule with the static routing rule by superimposing the dynamic routing rule on top of the static routing rule, wherein the new single combination rule comprises one condition and one action of the dynamic routing rule and one action of the static routing rule;
   evaluating all dynamic branches within the dynamic routing rule at once or on demand every time a dynamic branch is reached; and
   executing the new single combination routing rule to route a message.

10. The computer readable media of claim 9, wherein the message is an Extensible Markup Language message.

11. The computer readable media of claim 9, wherein the executing comprises using Java Message Service.

* * * * *

UNITED STATES PATENT AND TRADEMARK OFFICE
CERTIFICATE OF CORRECTION

PATENT NO. : 9,652,309 B2
APPLICATION NO. : 12/120825
DATED : May 16, 2017
INVENTOR(S) : Joshi et al.

It is certified that error appears in the above-identified patent and that said Letters Patent is hereby corrected as shown below:

On the Title Page

Column 2, under Other Publications, Line 11, delete "Ingtegration" and insert -- Integration --, therefor.

In the Specification

In Column 5, Line 15, after "plan" insert -- . --.

Signed and Sealed this
Thirty-first Day of October, 2017

Joseph Matal
*Performing the Functions and Duties of the
Under Secretary of Commerce for Intellectual Property and
Director of the United States Patent and Trademark Office*